(12) United States Patent
Dahl et al.

(10) Patent No.: US 11,059,366 B2
(45) Date of Patent: Jul. 13, 2021

(54) COOLING AIR SUPPLY DEVICE FOR A MOTOR VEHICLE

(71) Applicant: Dr. Ing. h.c. F. Porsche Aktiengesellschaft, Stuttgart (DE)

(72) Inventors: Benno Dahl, Stuttgart (DE); Thomas Wolf, Leonberg (DE); Alexander Koeppe, Erkrath (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/543,652

(22) Filed: Aug. 19, 2019

(65) Prior Publication Data

US 2020/0086733 A1     Mar. 19, 2020

(30) Foreign Application Priority Data

Sep. 18, 2018 (DE) ...................... 10 2018 122 784.1

(51) Int. Cl.
*B60K 11/08* (2006.01)
*B60K 11/06* (2006.01)

(52) U.S. Cl.
CPC ............ *B60K 11/085* (2013.01); *B60K 11/06* (2013.01)

(58) Field of Classification Search
CPC ....... B60K 11/085; B60K 11/08; B60K 11/06; B60K 11/04; B60K 11/02; B60K 13/02
USPC ...................................... 180/68.1, 68.2, 68.3
See application file for complete search history.

(56) References Cited

U.S. PATENT DOCUMENTS

| | | | | | |
|---|---|---|---|---|---|
| 3,618,998 | A | * | 11/1971 | Swauger | B62D 35/005 296/180.5 |
| 4,131,308 | A | * | 12/1978 | Holka | B62D 35/005 296/180.5 |
| 4,778,212 | A | * | 10/1988 | Tomforde | B62D 35/005 296/180.1 |
| 4,976,489 | A | * | 12/1990 | Lovelace | B62D 35/005 296/180.1 |
| 9,469,355 | B2 | * | 10/2016 | Wolf | B62D 35/02 |

FOREIGN PATENT DOCUMENTS

| DE | 19904515 A1 | 8/2000 |
|---|---|---|
| DE | 102014118645 A1 | 6/2016 |

* cited by examiner

*Primary Examiner* — John D Walters
(74) *Attorney, Agent, or Firm* — Leydig, Voit & Mayer, Ltd.

(57) ABSTRACT

A cooling air supply device for a motor vehicle has a motor vehicle body with an underbody and a unit. The cooling air supply device configured to receive cooling air in the form of an air flow which flows along the underbody counter to the direction of travel, and configured to be self-regulating. The cooling air supply device having a molded part, which is pivotable about an axis of rotation, has an outer surface facing away from the underbody, and has a convex curvature relative to the underbody. A flow duct is between the underbody and the molded part, the flow duct being configured to allow the air flow to be conducted to the unit.

14 Claims, 5 Drawing Sheets

COOLING AIR SUPPLY DEVICE FOR A MOTOR VEHICLE

CROSS-REFERENCE TO PRIOR APPLICATIONS

Priority is claimed to German Patent Application No. DE 10 2018 122 784.1, filed on Sep. 18, 2018, the entire disclosure of which is hereby incorporated by reference herein.

FIELD

The invention relates to a cooling air supply device for a motor vehicle.

BACKGROUND

Cooling air supply devices serve for cooling units of the motor vehicle. An air flow is conducted with the aid of the air cooling supply device to or at least into the vicinity of the unit to be cooled. For example, a motor vehicle body of the motor vehicle, which includes an engine arranged in the front region or in a front section of the motor vehicle body, has what is referred to as a radiator grill via which cooling air is supplied to an air radiator of the engine, referred to below as radiator. Even motor vehicles which have an engine arranged in the central region of the motor vehicle body or in the rear of the motor vehicle body are provided with a cooling air supply device which includes the radiator positioned in the front region, wherein complex hose line systems for guiding the cooling air are formed here.

DE 10 2014 118 645 A1 discloses a cooling air supply device for a motor vehicle, which is provided with a head wind flowing along an underbody of the motor vehicle for cooling a drive unit, in the form of an underfloor engine or a rear engine, of the motor vehicle, wherein the cooling air supply device has a control device with the aid of which it is adjustable.

Furthermore, DE 199 04 515 B4 discloses a cooling air supply device for a motor vehicle, the cooling air supply device being designed to be self-regulating. For the speed-dependent adjustment, it has an extension which is operatively connected to a flap which is designed to release or close a flow duct of the cooling air supply device. A mass of the extension is greater than a mass of the flap. The extension is operatively connected to the flap at a pivot point thereof. Closing of the flap is brought about with the aid of the additional mass because of the unequal mass ratios. The flap and the extension have to be coordinated with each other in terms of mass here so that an error behavior of the cooling air supply device because of too early or late opening and/or closing is suppressed. Furthermore, the extension has to be guided in a guide, as a result of which a more complex design of the cooling air supply device is required in order in particular to avoid jamming of the flap.

Self-regulating cooling air supply devices ensure the cooling of the unit, and conventionally improved efficiency of same, without complicated regulating elements at high speeds at which the unit conventionally release a high degree of heat.

SUMMARY

An embodiment of the present invention provides a cooling air supply device for a motor vehicle has a motor vehicle body with an underbody and a unit. The cooling air supply device configured to receive cooling air in the form of an air flow which flows along the underbody counter to the direction of travel, and configured to be self-regulating. The cooling air supply device having a molded part, which is pivotable about an axis of rotation, has an outer surface facing away from the underbody, and has a convex curvature relative to the underbody. A flow duct can be formed between the underbody and the molded part, through which flow duct the air flow can be conducted to the unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
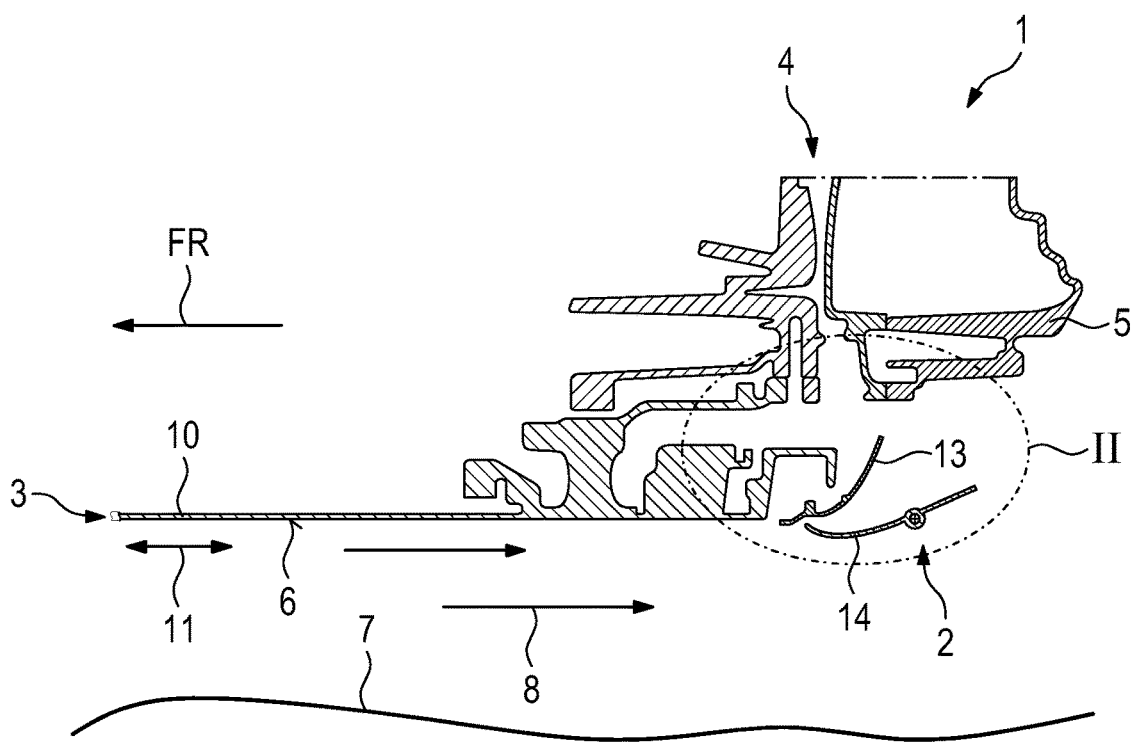
FIG. 1 shows, in a schematic longitudinal sectional illustration, a motor vehicle including a cooling air supply device according to the invention in an inoperative position.

Embodiments of the present invention to provide a simple and cost-effective cooling air supply device for a motor vehicle.

A cooling air supply device, according to an embodiment of the invention, for a motor vehicle, which has a motor vehicle body with an underbody and a unit, is designed for receiving cooling air which flows along the underbody, in particular counter to the direction of travel. The cooling air supply device is designed to be self-regulating. According to an embodiment of the invention, the cooling air supply device has a molded part which is pivotable about an axis of rotation and its outer surface formed facing away from the underbody has an in particular convexly formed curvature relative to the underbody, where a flow duct can be formed between the underbody and the molded part, through which flow duct the air flow can be conducted to the unit. Owing to the curvature, on the outer surface a pressure, in particular a negative pressure, is generated on the molded part by the cooling air flowing along the underbody, as a result of which the molded part is drawn in the direction facing away from the underbody. This is dependent on a flow speed of the cooling air and therefore dependent on the driving speed of the motor vehicle.

If the pressure is of a size sufficient to move the molded part in such a manner that an inlet edge of the molded part is arranged in the flow of the cooling air, the molded part is pressed further downward by a dynamic pressure formed between the underbody and the molded part. Since, even with a small deflection, very high forces act on the molded part, a resetting element is formed, preferably cost-effectively in the form of a spiral spring or a torsion bar spring, as a result of which the molded part can be held in a certain operative position. Of course, the resetting element is also provided for the secured positioning of the molded part in its inoperative position. In addition, for further force absorption, in particular at average to high driving speeds, a damping element is assigned to the resetting element. Deployment of the molded part is thus slowed down in order to avoid damage. The resetting element is formed in a manner operatively connected to the molded part with the aid of a lever arm, as a result of which dimensioning of the resetting element can be undertaken depending on a length of the lever arm. There is therefore the possibility of using a compact resetting element.

In a further refinement of the cooling air supply device according to the invention, the inlet edge of the molded part formed in the direction of a front of the motor vehicle is arranged spaced apart from a surface formed opposite it in the direction of the underbody. If the pressure, in particular negative pressure, generated with the aid of the curvature does not have a sufficient value for drawing the molded part downward at a desired driving speed, the inlet edge which is part of an inlet opening of the flow duct is already at a distance from the opposite surface in an inoperative position. The distance should preferably be formed in a value range of 0 to 20 mm. With the aid of the distance, the inlet edge is already located in the flow of the cooling air in such a manner that, even at low driving speeds, cooling air can be supplied to the unit via the flow duct. Of course, even in this embodiment, the flow duct is enlarged as the driving speed increases.

The size of the distance is in particular dependent on a weight of the flap and the resetting element. Furthermore, the size is dependent on the motor vehicle itself and its motorization and a desired cooling requirement.

In one embodiment of the cooling air supply device according to the invention, the, in particular convex, curvature is formed upstream of the axis of rotation of the molded part. If the axis of rotation is formed downstream of the curvature, there is the possibility, in order to increase the speed of the cooling air flowing through the flow duct, to design the flow duct, in particular in its maximum operative position, in the manner of a venturi nozzle, wherein the inlet opening is designed to be larger than an outlet opening of the flow duct. The outlet opening corresponds to an end, formed in a manner facing the unit, of the flow duct which is formed with the aid of the molded part.

The axis of rotation is preferably formed extending in the direction of a transverse axis of the body, as a result of which smaller compressive forces are required than if the axis of rotation were formed transversely with respect to the transverse axis of the body.

In order to use the cooling air supply device for a multiplicity of motor vehicles, the inlet edge is formed such that it can be spaced apart in a variable manner from the surface. In an advantageous manner, an adjustment element is formed for this purpose, with the aid of which a variable distance can be brought about in a simple manner between the inlet edge and the surface.

The pivotable molded part can be attached directly to the underbody. However, it is advantageous to accommodate the molded part pivotably in a housing since, with the aid of the housing, a surface lying opposite an inner surface of the molded part can be configured independently of the underbody so that the flow duct obtains a preferred, flow optimized shape. Furthermore, a housing edge of the housing formed in the direction of the front of the motor vehicle can be configured in such a manner that the flow of the cooling air is preferably directed onto the molded part.

Further advantages, features and details of the invention emerge from the description below of preferred exemplary embodiments and with reference to the drawings. The features and combinations of features mentioned above in the description and the features and combinations of features mentioned below in the description of the figures and/or shown in the figures alone can be used not only in the respectively stated combination, but also in other combinations or on their own without departing from the scope of the invention.

FIG. 1 illustrates, in a longitudinal section, part of a motor vehicle 1 having a cooling air supply device 2 according to the invention. The motor vehicle 1 includes a motor vehicle body 3 and a drive train 4 with a unit 5. The motor vehicle body 3 is configured by way of example in the form of a coupé. Similarly, the motor vehicle body 3 could also have any other conceivable form.

In the present exemplary embodiment, the unit 5 is in the form of a transmission unit. It may also be designed as a drive unit in the form of an engine which is designed, for example, as an internal combustion engine or as an electric motor. Of course, the cooling air supply device 2 according to the invention does not serve exclusively for supplying cooling air to the transmission unit 5 or to the drive unit, but rather can be used for supplying cooling air for any other unit of the motor vehicle 1. For example, the cooling air supply device 2 according to the invention could serve for supplying cooling air to a radiator of the internal combustion engine.

The cooling air supply device 2 is arranged upstream of the unit 5 subject to a positioning of the unit 5 in the motor vehicle body 3. That is to say, in other words, it is arranged upstream of the unit 5, as viewed in a viewing direction from a front section in the direction of a rear of the motor vehicle body 3. The cooling air supply device 2 should be arranged in the vicinity of the unit 5 and preferably centrally with respect thereto for effective supply of cooling air.

In the present exemplary embodiment, the cooling air supply device 2 is attached to a lower surface 6 of the motor vehicle body 3, the lower surface being formed opposite a driving surface 7. During operation of the motor vehicle 1, an air flow 8 can therefore flow along between the driving surface 7 and the lower surface 6, thus counter to a direction of travel FR.

The cooling air supply device 2 according to the invention is designed to be self-regulating. That is to say, in other words, that a flow duct of the cooling air supply device 2 is opened or the flow duct is closed depending on a prevailing pressure p.

Figure 5:
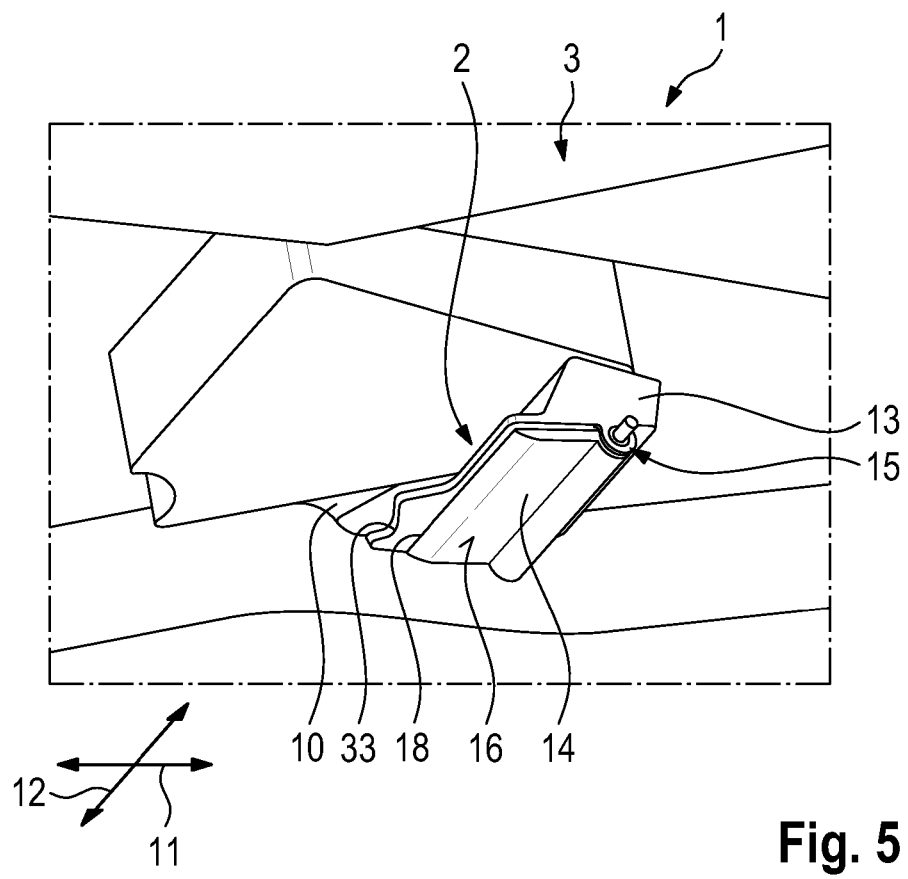
FIG. 5 shows, in a perspective bottom view, the motor vehicle with the cooling air supply device according to the invention.

The motor vehicle body 3 includes an underbody 10 having the lower surface 6 which extends at least partially in the direction of a longitudinal axis 11 of the motor vehicle body 3 and in the direction of a transverse axis 12 of the motor vehicle body 3, see FIG. 5. It should be mentioned at this juncture that, in this connection, the underbody 10 should be understood as meaning not only a body surface of the motor vehicle body 3 opposite a driving surface, but also a component which is designed so as to delimit the motor vehicle body 3 from the driving surface.

The cooling air supply device 2 is designed for receiving cooling air in the form of the air flow 8 and for the directed further conduction of same. It includes a first molded part 13 in the form of a housing and a second molded part 14 which is accommodated movably on the first molded part 13 and is referred to below as a flap. The first molded part 13 is fastened immovably to the motor vehicle body 3. It has a bearing 15 with the aid of which the flap 14 is accommodated on the molded part so as to be movable about an axis of rotation 19.

Figure 2:
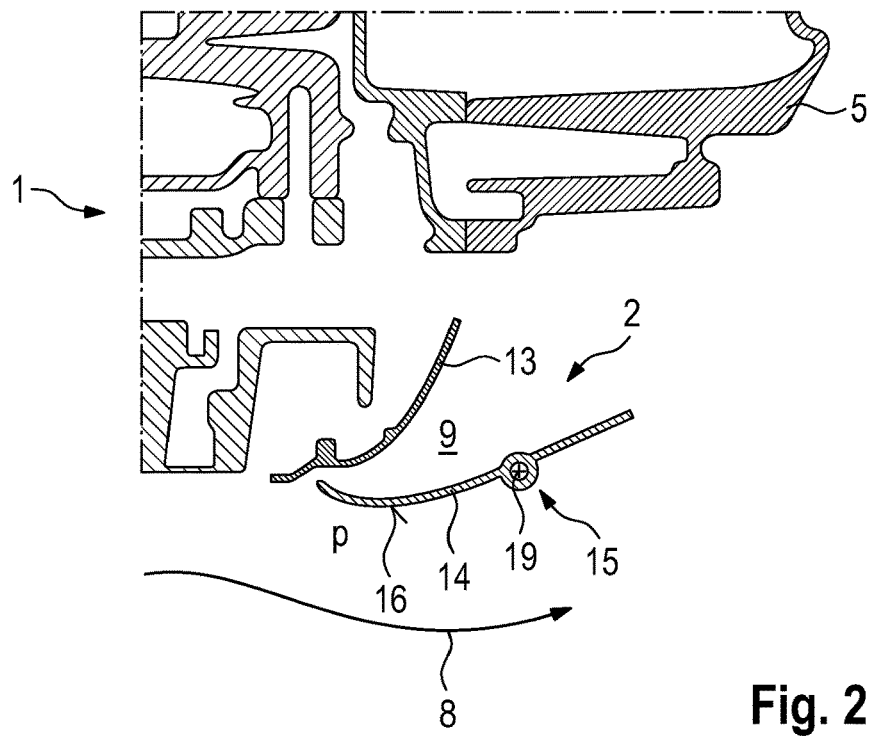
FIG. 2 shows, in a view of a detail II, the cooling air supply device according to FIG. 1.
Figure 3:
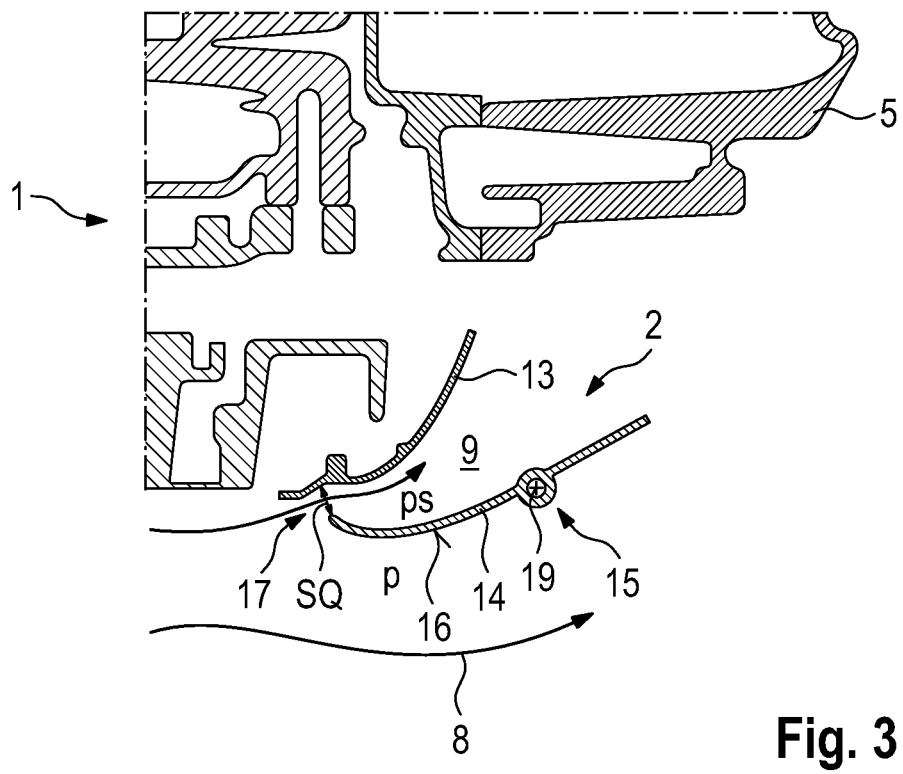
FIG. 3 shows, in a view of a detail, the cooling air supply device in an operative position.
Figure 4:
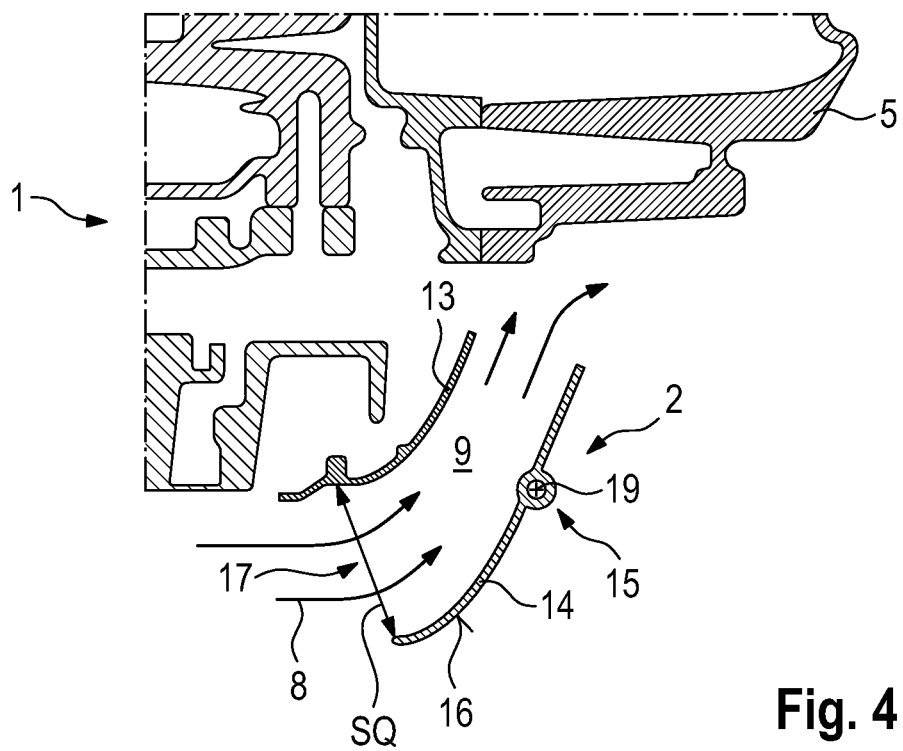
FIG. 4 shows, in a view of a detail, the cooling air supply device in a maximum operative position.

FIGS. 2 to 4 illustrate the cooling air supply device 2 according to the invention in different positions. In FIG. 2, it is illustrated in a position closing the flow duct 9, the inoperative position thereof. The pressure p prevailing at the flap 14, on the outer surface 16 thereof formed opposite the driving surface 7, and which is a negative pressure in relation to a pressure pS present in the flow duct 9 is insufficient for the flap 14 to be able to be moved out of its inoperative position. This position corresponds to the inoperative position at a standstill or at a low driving speed of the motor vehicle 1. The opening of the flow duct 9 for the throughflow is not absolutely necessary since, at these operating points of the motor vehicle 1, the unit 5 requires less cooling. The flap 14 is held in its inoperative position with the aid of a resetting element 22. In this position, there is no increased air resistance, in particular because of the curved outer surface 16.

FIG. 3 illustrates the cooling air supply device 2 in an operative position which is formed between the inoperative position and a maximum operative position, as illustrated in FIG. 4. The maximum operative position corresponds to a maximum opening of the flow duct 9.

In the operative position illustrated in FIG. 3, the negative pressure p prevailing on the outer surface 16 is sufficient for the flap 14 to be moved relative to the first molded part 13 and for the flow duct 9 to be opened for the throughflow of the air flow 8. An inlet opening 17 of the flow duct 9, the inlet opening being formed in the direction of travel FR, is therefore opened. This operative position is predominantly set at average speed. In the position illustrated, the speed of the motor vehicle is increased in relation to the previously described inoperative position. Owing to the curved outer surface 16, the air resistance is increased only slightly. In particular, this operative position is aerodynamically highly efficient.

In the maximum operative position of the flap 14, as illustrated in FIG. 4 and as is conventionally formed at high speeds, the flow duct 9 is completely open, wherein the inlet opening 17 has its maximum flow cross section SQ. The operative position illustrated corresponds to the maximum operative position of the flap 14 at high driving speeds at which generally the unit 5 requires a high degree of cooling. In order to bring about the maximum operative position, starting from an opening of the flow cross section SQ, the flap 14 is brought with the aid of an inner surface 21 of the flap 14, the inner surface now lying in the air flow 8, being formed facing the underbody 10 and preferably being formed in a manner curved concavely relative to the underbody, is brought into its maximum opening position, the maximum operative position. The flow duct 9 opens up its maximum flow cross section SQ. A maximum incident flow of the unit 5 with cooling air takes place in the maximum operative position.

For better comprehension, FIG. 5 illustrates the motor vehicle 1 having the cooling air supply device 2 according to the invention in the mounted state on the underbody 10.

Figure 6:
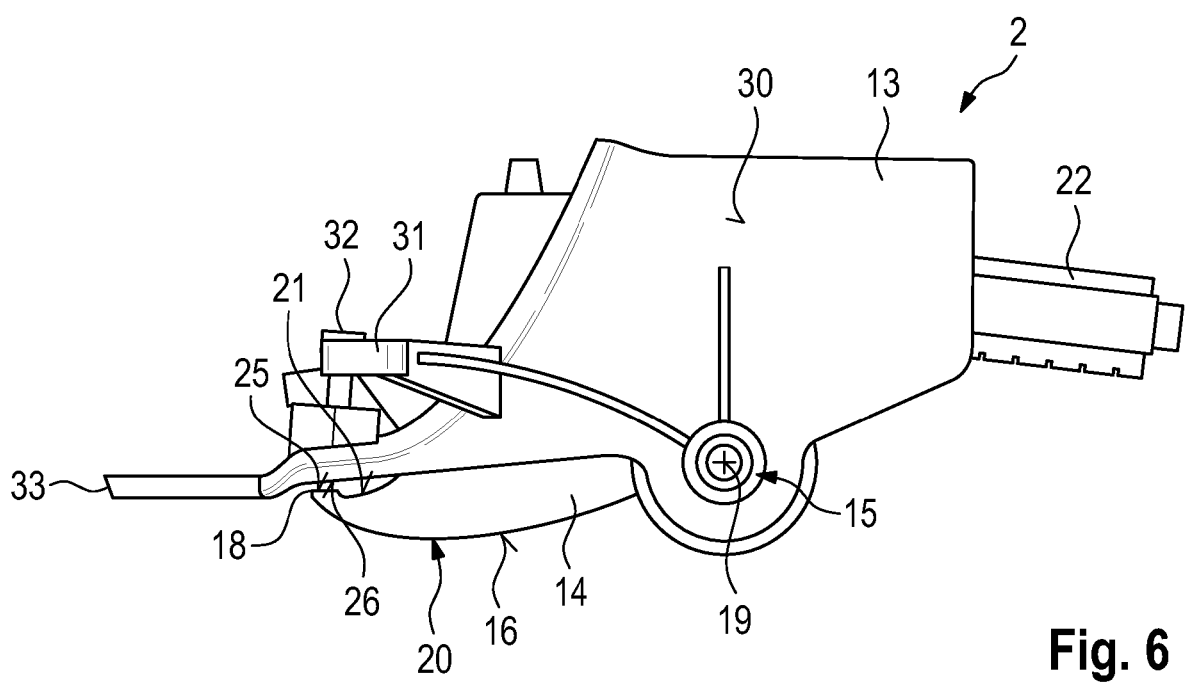
FIG. 6 shows, in a side view, the cooling air supply device according to the invention.

FIG. 6 illustrates the cooling air supply device 2 according to the invention in a side view. The flap 14 is mounted on the housing 13 so as to be pivotable about the axis of rotation 19. Its outer surface 16 is formed curved in the direction of the driving surface. That is to say, in other words, the outer surface 16 is formed in a curved manner relative to the underbody 10, in particular as a convex curvature 20.

The inner surface 21 of the flap 14 formed facing away from the outer surface 16 is likewise configured in a curved manner in order to form the flow duct 9, as a result of which, in particular when the inlet opening 17 is slightly opening, a blade-like receptacle of the air flow 8 is formed, and therefore a more rapid increase of the inlet opening 17, subject to the speed, as far as the maximum flow cross section SQ can be brought about.

For the noise-free contact of the flap 14 against the first molded part 13 when the inlet opening 17 is closed, the inner surface 21 has a flat contact surface 25 which is configured in a complementary manner with respect to a stop surface 26 formed on the molded part 13. For further noise damping, the contact surface 25 and/or the stop surface 26 can have a noise-insulating layer which can absorb the pulse brought about when the contact surface 25 strikes against the stop surface 26. That is to say, in other words, the layer can be formed from a preferably reversibly compressible material.

Figure 7:
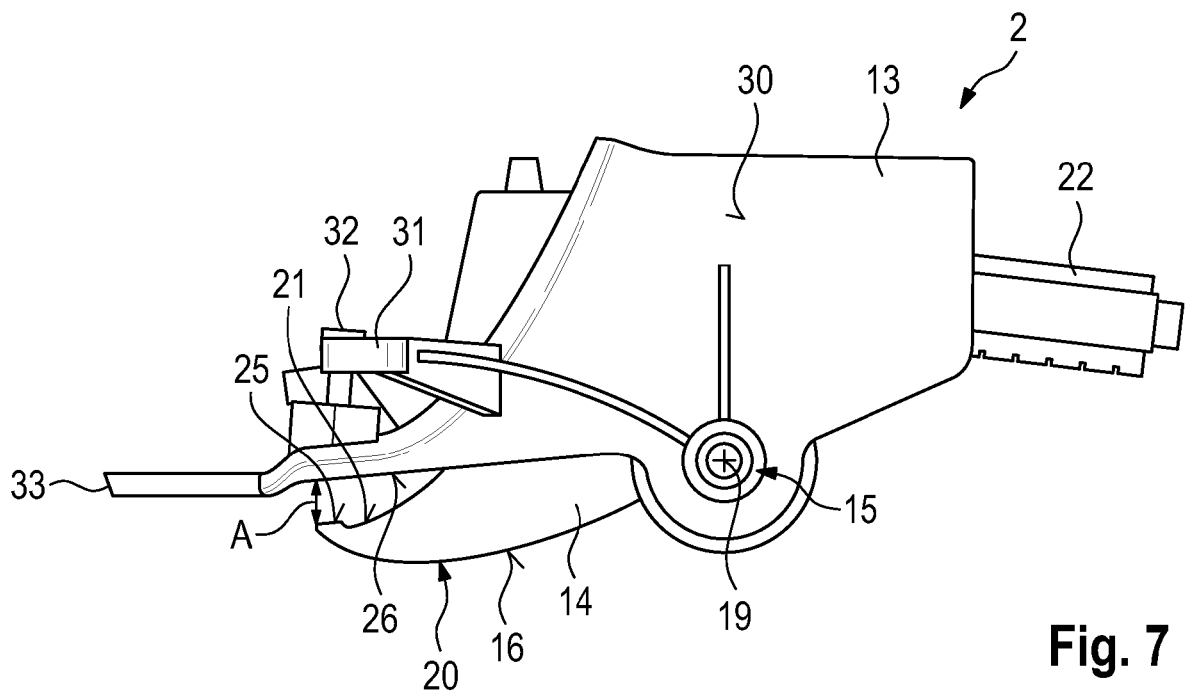
FIG. 7 shows, in a side view, the cooling air supply device according to the invention in a further exemplary embodiment.

FIG. 7 illustrates the cooling air supply device 2 according to the invention in a further exemplary embodiment, wherein, in the further exemplary embodiment, a distance A is formed between the contact surface 25 and the stop surface 26 in the inoperative position of the flap 14. That is to say, in other words, that the flow duct 9 is always at least slightly open.

Figure 8:
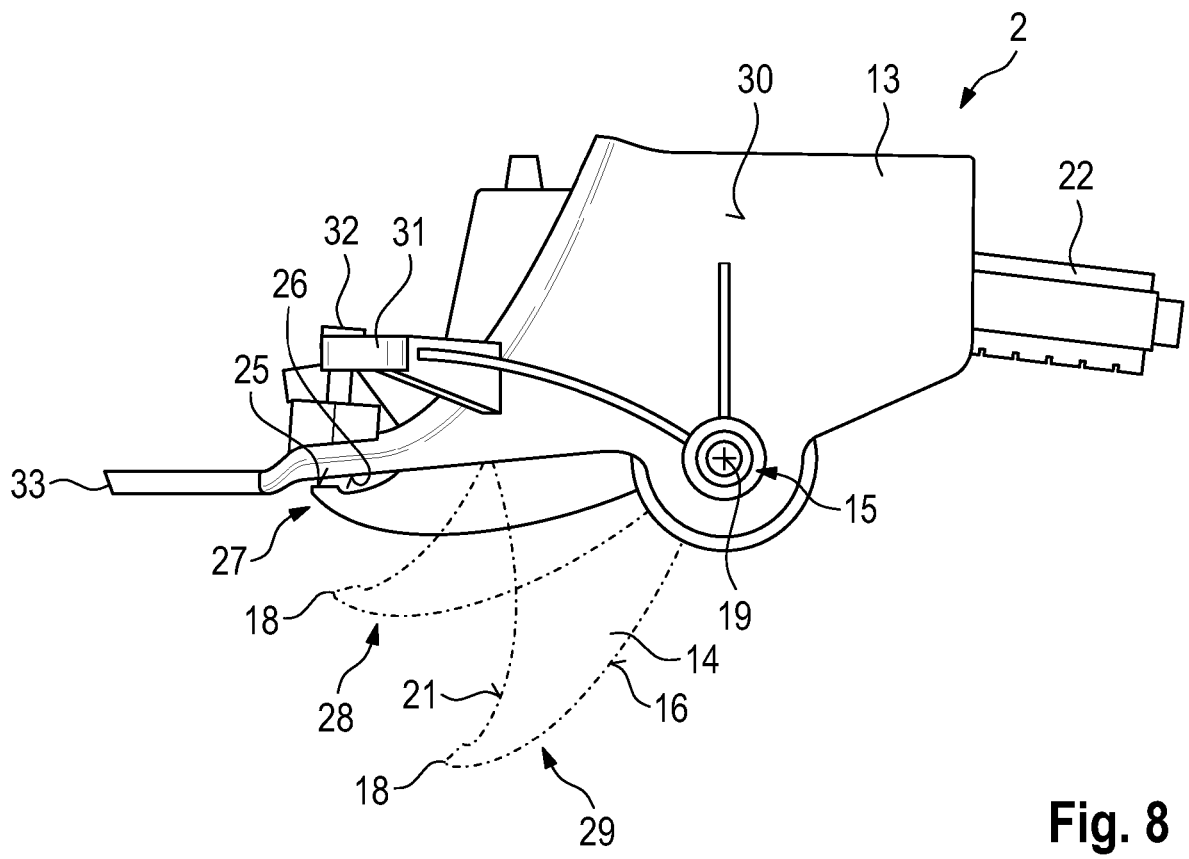
FIG. 8 shows, in a side view, the cooling air supply device according to the invention according to FIG. 6 in different operative positions.
Figure 9:
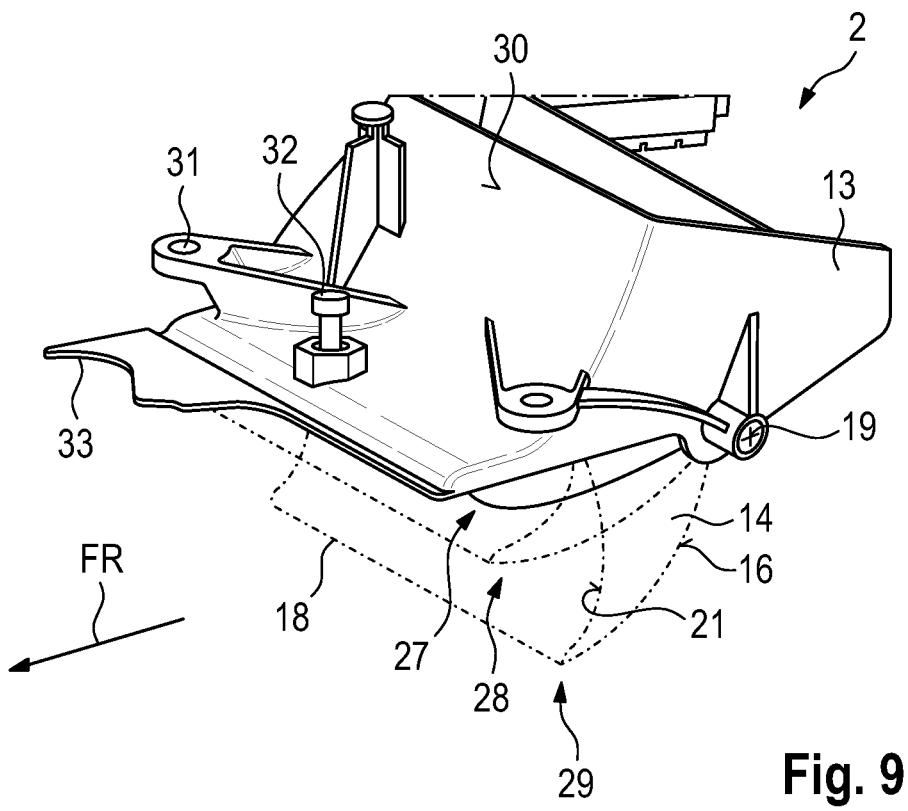
FIG. 9 shows, in a perspective view, the cooling air supply device according to FIG. 8.
Figure 10:
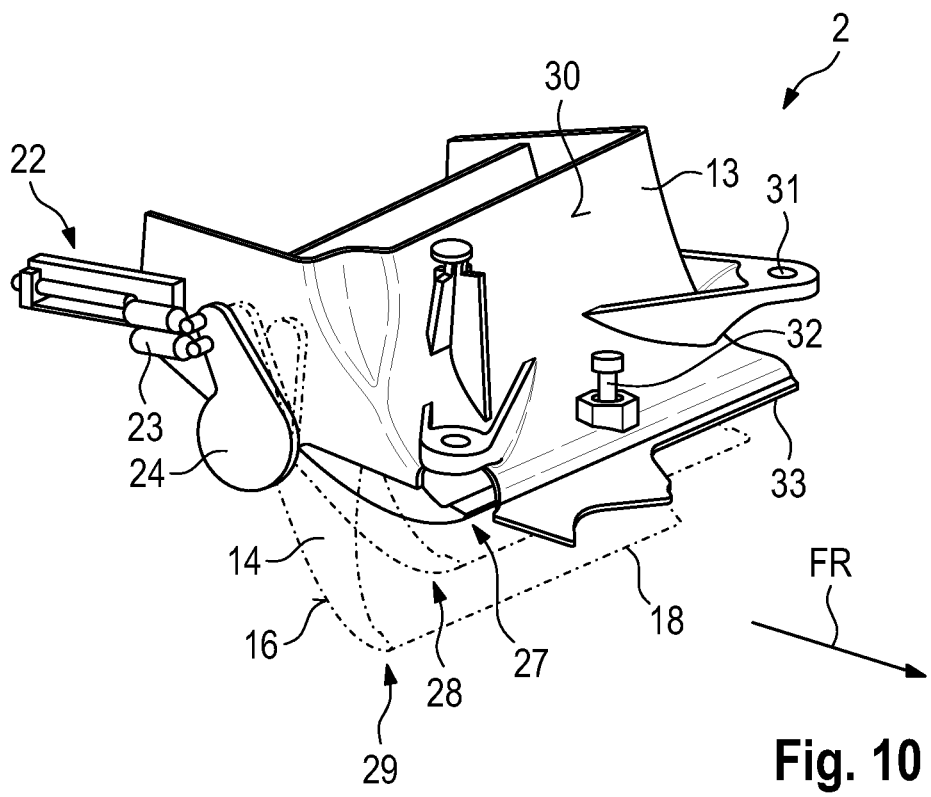
FIG. 10 shows, in a further perspective view, the cooling air supply device according to FIG. 8.

FIGS. 8 to 10 illustrate the cooling air supply device 2 according to the invention according to FIG. 6 in different operative positions and in different views. In addition to the inoperative position 27, an operative position 28 and the maximum operative position 29 are illustrated. The maximum operative position 29 has a maximum cross section of the inlet opening 17. The flap 14 can take up numerous further operative positions 28 between the inoperative position 27 and the maximum operative position 29.

In order to rest the flap 14 and for the secure positioning of the flap 14 in each position, the resetting element 22 is provided which, in this exemplary embodiment, is in the form of a spiral spring. It could also be designed in the form of a torsion bar spring.

The resetting element 22 is operatively connected to a lever arm 24 which is fixedly connected to the flap 14. That is to say, in other words, when the flap 14 is correspondingly acted upon by the air flow 8, a torque is present on the lever arm 24, the torque leading to the corresponding deflection, in the present case an expansion, of the resetting element 22. In order to damp the movement of the flap 14, a damping element 23 is additionally arranged on the resetting element 22.

The first molded part 13 has, on its housing outer surface 30, holding elements 31 in the form of receiving openings, with the aid of which the molded part can be fastened to the underbody 10. Furthermore, an adjustment element 32 is provided which serves for setting the distance A. The cooling air supply device 2 according to the invention can therefore be produced cost-effectively in a simple manner in a single design for numerous motor vehicles 1 of differing type and motorization.

In the region of the inlet edge 18 of the flap 14, the housing part 13 has a housing edge 33 which is designed to be adaptable to the underbody 10 and/or for flow guidance of the air flow 8 onto the inlet edge 18 and therefore for bringing about a rapidly opened flow duct 9.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cooling air supply device for a motor vehicle, the motor vehicle having a motor vehicle body with an underbody and a unit, the cooling air supply device being configured to receive cooling air in the form of an air flow which flows along the underbody counter to the direction of travel, and the cooling air supply device being configured to be self-regulating, the cooling air supply device comprising:
a molded part, which is pivotable about an axis of rotation, has a curved outer surface relative to the underbody, the curved outer surface having a convex curvature facing away from the underbody and curving in the direction of a driving surface, wherein the convex curvature of the curved outer surface extends from a leading edge of the molded part to a pivot at the axis of rotation, wherein a flow duct is formable between the underbody and the molded part, through which flow duct the air flow is conductable to the unit.

2. The cooling air supply device as claimed in claim 1, wherein the convex curvature is upstream of the axis of rotation of the molded part.

3. The cooling air supply device as claimed in claim 1, wherein the axis of rotation extends in a direction of a transverse axis of the body.

4. The cooling air supply device as claimed in claim 1, wherein an inlet edge of the molded part formed in the direction of a front of the motor vehicle is arranged spaced apart from a surface formed opposite it in the direction of the underbody.

5. The cooling air supply device as claimed in claim 4, wherein the inlet edge is formed such that it can be spaced apart in a variable manner from the surface.

6. The cooling air supply device as claimed in claim 5, wherein the inlet edge is always spaced apart from the surface.

7. The cooling air supply device as claimed in claim 1, wherein the molded part is accommodated pivotably in a housing.

8. The cooling air supply device as claimed in claim 1, wherein the molded part is designed such that it can be brought into an inoperative position with the aid of a resetting element.

9. The cooling air supply device as claimed in claim 8, wherein the resetting element is designed in the form of a spring element, in particular in the form of a spiral spring.

10. The cooling air supply device as claimed in claim 8, wherein the resetting element comprises a damping element.

11. The cooling air supply device as claimed in claim 8, wherein the resetting element is formed in a manner operatively connected to the molded part with the aid of a lever arm.

12. The cooling air supply device as claimed in claim 1, wherein the molded part has an inner surface facing the underbody, the inner surface having a concave curvature relative to the underbody.

13. A cooling air supply device for a motor vehicle, the motor vehicle having a motor vehicle body with an underbody and a unit, the cooling air supply device being configured to receive cooling air in the form of an air flow which flows along the underbody counter to the direction of travel, and the cooling air supply device being configured to be self-regulating, the cooling air supply device comprising:
a molded part, which is pivotable about an axis of rotation, has a curved outer surface relative to the underbody, the curved outer surface having a convex curvature facing away from the underbody and curving in the direction of a driving surface, wherein a flow duct is formable between the underbody and the molded part, through which flow duct the air flow is conductable to the unit
wherein the molded part is configured as a flap,
wherein the cooling air supply device comprises a housing accommodating the flap,
wherein the flap has an inlet edge forming an entrance to the flow duct, and is pivotably attached to the housing at the axis of rotation; and
wherein the housing comprises a housing edge, the housing edge being positioned forward of the inlet edge extending toward the direction of travel, and being configured to guide the airflow into the air duct.

14. A cooling air supply device for a motor vehicle, the motor vehicle having a motor vehicle body with an underbody and a unit, the cooling air supply device being configured to receive cooling air in the form of an air flow which flows along the underbody counter to the direction of travel, and the cooling air supply device being configured to be self-regulating, the cooling air supply device comprising:
a molded part, which is pivotable about an axis of rotation, has a curved outer surface relative to the underbody, the curved outer surface having a convex curvature facing away from the underbody and curving in the direction of a driving surface, wherein a flow duct is formable between the underbody and the molded part, through which flow duct the air flow is conductable to the unit, wherein the molded part is configured as a flap and further comprises:

an inlet edge at a forward end of the flap, facing toward the direction of travel, and extending in a transverse axis of the motor vehicle;

a bottom trough comprising the curved outer surface as its bottom surface, the bottom trough extending from the inlet edge in a direction counter to the direction of travel at a bottom side of the flap; and an contact surface extending from the inlet edge in the direction counter to the direction of travel at a top side of the flap, the contact surface arranged adjacent to an underbody contact surface of a housing that accommodates the flap.

\* \* \* \* \*